United States Patent
Cox (10) Patent No.: US 7,202,463 B1
(45) Date of Patent: Apr. 10, 2007

(54) HIGHER DYNAMIC RANGE IMAGE SENSOR WITH SIGNAL INTEGRATION

(75) Inventor: Christopher B. Cox, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 11/229,330

(22) Filed: Sep. 16, 2005

(51) Int. Cl.
*G01J 1/44* (2006.01)
*H01L 27/00* (2006.01)

(52) U.S. Cl. .............................. 250/214 R; 250/208.1; 250/214 SW; 250/214 DC; 348/296; 348/310

(58) Field of Classification Search ............. 250/208.1, 250/214 R, 214 DC, 214 SW; 327/514; 348/296, 297, 308, 310
See application file for complete search history.

(56) References Cited

U.S. PATENT DOCUMENTS

| | | | |
|---|---|---|---|
| 6,248,990 B1 * | 6/2001 | Pyyhtia et al. ........... | 250/208.1 |
| 6,570,615 B1 * | 5/2003 | Decker et al. .............. | 348/272 |
| 6,642,495 B2 * | 11/2003 | Lowrance et al. ....... | 250/208.1 |
| 6,642,503 B2 * | 11/2003 | Kummaraguntla et al. ...... | 250/214.1 |
| 6,678,039 B2 * | 1/2004 | Charbon .................... | 356/5.01 |
| 6,885,047 B2 | 4/2005 | Shinohara et al. | |
| 6,919,549 B2 * | 7/2005 | Bamji et al. ............. | 250/208.1 |
| 2004/0118994 A1 * | 6/2004 | Mizuno .................. | 250/214 R |
| 2006/0027730 A1 * | 2/2006 | Bamji et al. ............. | 250/208.1 |

OTHER PUBLICATIONS

Debevec & Malik, Recovering High Dynamic Range Radiance Maps from Photographs, Computer Science Division, U. of California at Berkeley, pp. 1-10, Berkeley, CA.
Kavusi & El Gamal, Quantitative Study of High Dynamic Range Image Sensor Architectures, Dept. of Electrical Engineering, Stanford University, pp. 1-12, Stanford, CA.
El Gamal, High Dynamic Range Image Sensors, Tutorial at International Solid-State Circuits Conference, Feb. 2002.
White Paper: Digital Pixel System Technology, Platform Overview Rev. 2.0, Dec. 2005, pp. 1-21, PIXIM Digital Pixel System, Mountain View, CA.
Pixim Digital Pixel System Technology Backgrounder, pp. 1-3, PIXIM Digital Pixel System, 2004, Pixim, Inc.
Pixim Digital Pixel System Technology Backgrounder, pp. 1-2, PIXIM Digital Pixel System, Pixim, Inc.
SMaL Camera Technologies, pp. 1-3, www.smalcamera.com/technology.html.

* cited by examiner

*Primary Examiner*—Stephone B. Allen
*Assistant Examiner*—Davienne Monbleau
(74) *Attorney, Agent, or Firm*—Berkeley Law & Technology Group (57) ABSTRACT

Briefly, in accordance with one embodiment of the invention, a higher dynamic range image sensor may be implemented by comparing a voltage across the sensor to a threshold voltage during image capture. At the threshold voltage, a count may be registered and the image sensor may be reset for continued image capture until an exposure is complete. A final image signal may be obtained by multiplying the threshold voltage by the number of counts registered and adding the final image sensor voltage.

24 Claims, 6 Drawing Sheets

HIGHER DYNAMIC RANGE IMAGE SENSOR WITH SIGNAL INTEGRATION

BACKGROUND

Image sensing circuits to provide higher dynamic ranges for photodiode circuits or the like currently utilized in imaging systems may have problems handling changing light values from time varying lighting conditions and may require extensive off-sensor circuitry for multiple readouts of the photodiode voltage. Other image sensing circuits attempt to manipulate the sensitivity of the photodiode for example using a logarithmic sensor approach or by adjusting the well capacity of the photodiode.

DESCRIPTION OF THE DRAWING FIGURES

Claimed subject matter is particularly pointed out and distinctly claimed in the concluding portion of the specification. However, both as to organization and/or method of operation, together with objects, features, and/or advantages thereof, may best be understood by reference to the following detailed description when read with the accompanying drawings in which:

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

An algorithm and/or process may be generally considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities.

Unless specifically stated otherwise, as apparent from the following discussions, it is appreciated that throughout the specification discussion utilizing terms such as processing, computing, calculating, determining, and/or the like, refer to the action and/or processes of a computer and/or computing system, and/or similar electronic computing device, that manipulate or transform data represented as physical, such as electronic, quantities within the registers and/or memories of the computer and/or computing system and/or similar electronic and/or computing device into other data similarly represented as physical quantities within the memories, registers and/or other such information storage, transmission and/or display devices of the computing system and/or other information handling system.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

Figure 1:
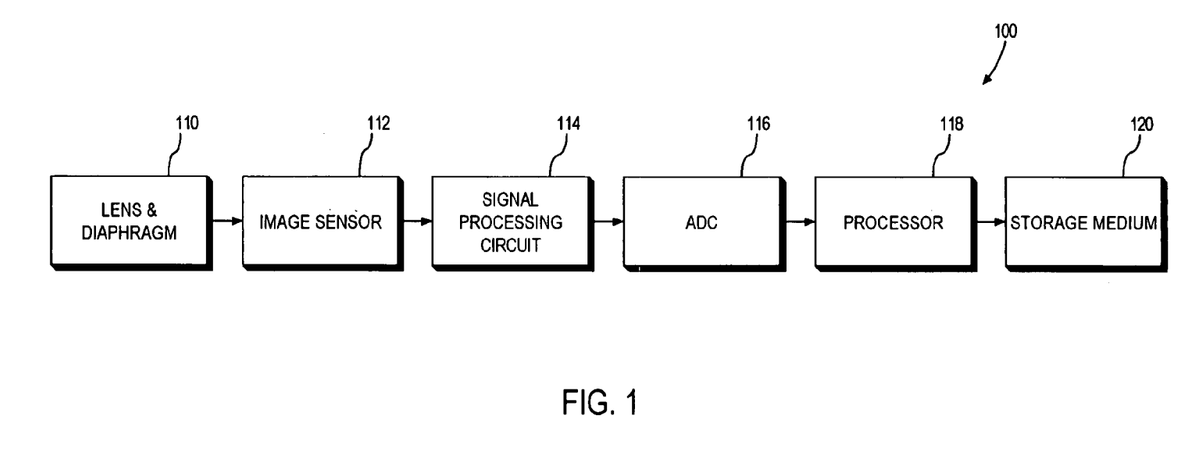
FIG. 1 is a block diagram of a camera type device including an image sensor accordance with one or more embodiments.

Referring now to FIG. 1, a block diagram of a camera type device including an image sensor in accordance with one or more embodiments will be discussed. As shown in FIG. 1, a camera type device 100 or the like type of device to capture an image, for example in an electronic format, may include a lens and diaphragm 110 to collect and focus an image. Lens and diaphragm 100 may provide a controllable f-stop, shutter speed, and/or aperture setting, to cause a light based image to impinge upon image sensor 112 that may convert the light based image into an electronic signal representative at least in part of the light based image. In one or more embodiments, camera type device 100 may not include a shutter and/or may optionally deactivate the shutter, at least temporarily, for example where camera type device is a video camera and/or a camera able to continuously capture images in a video mode, although the scope of the claimed subject matter is not limited in this respect. Signal processing circuit may provide electronic control and processing of the electronic signal, and may condition the signal for conversion of the signal into a digital format by analog-to-digital converter (ADC) 116. Analog-to-digital converter 116 may provide such a digital signal to processor 118 for further control and processing of the digital signal representation of the image, for example to store the image in storage medium 120 in an electronic format, for example in a format compliant with a Joint Photographic Experts Group (JPEG) standard, although the scope of the claimed subject matter is not limited in this respect. Camera type device 100 of FIG. 1 is merely an example of an image capturing device, and may include a greater number of blocks, a lesser number of blocks, and/or other substitute blocks and/or components, and the scope of the claimed subject matter is not limited in this respect.

Figure 2:
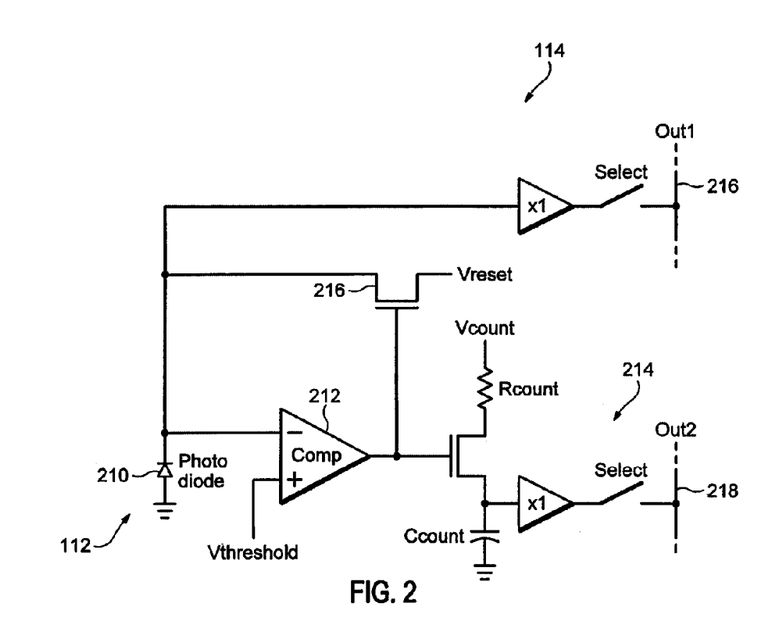
FIG. 2 is a circuit diagram of an image sensor and signal processing circuit in accordance with one or more embodiments.

Referring now to FIG. 2, a circuit diagram of an image sensor and signal processing circuit in accordance with one or more embodiments will be discussed. As shown in FIG. 2, the circuit diagram may correspond to image sensor 112 and/or signal processing circuit 114 of camera type device 100 of FIG. 1. Image sensor 112 may comprise, for example, one or more photodiodes 210 to convert light that impinges upon photodiode 210 into an electronic signal, for example where light that impinges upon the P-N junction of the diode may cause the conductivity of photodiode 210 in a reversed bias mode to be proportional at least in part to the intensity of the impinging light, although the scope of the claimed subject matter is not limited in this respect. Such a photodiode may exhibit such responsiveness in conductivity based upon the intensity of the impinging light up to a saturation limit.

As shown in the circuit of FIG. 2, photodiode 210 may be coupled to an input of comparator 212 to compare a reverse bias voltage drop across photodiode 210 to a threshold voltage. Comparator 212 may sense when photodiode 210 has reached its saturation limit, and then reset photodiode 210 via switch 216 while causing counter 214 to count the number of times that photodiode 210 is reset by comparator 212. In one embodiment, the threshold voltage may be set to the saturation limit of photodiode 210, and in an alternative embodiment the threshold voltage may be set at and/or near the saturation limit of photodiode 210, for example so that photodiode 210 may not actually reach saturation and/or complete saturation in one or more embodiments, although the scope of the claimed subject matter is not limited in this respect. The charge of photodiode 210 may be read at output 220, and the reset count may be read at output 218 at the end of an exposure. Buffers such as single bit buffers may be utilized to select and/or readout such values and/or for isolation. A final signal may be obtained by multiplying the number of times that photodiode 210 reached saturation during exposure with the threshold voltage value, and then adding the voltage value present on photodiode 210 at the end of the exposure.

As a result of the operation of image sensor 112 and/or signal processing circuit 114 as shown for example in FIG. 2, the dynamic range of photodiode 210 may be increased to several multiples of its inherent dynamic range, and such increase may be a linear, or at least a nearly linear, increase of the dynamic range, although the scope of the claimed subject matter is not limited in this respect. Such an increase in dynamic range may be implemented asynchronously without requiring a timing signal and/or timing circuit, and in at least one embodiment may be performed by using a single reading of the reset count measured by counter 214, although the scope of the claimed subject matter is not limited in this respect. Integration of a light signal impinging upon photodiode 210 may be performed continuously, or at least nearly continuously, wherein image sensor 112 and/or signal processing circuit 114 may capture time varying light signals due to, for example, motion and/or photographic flashes, which in one or more embodiments may be relatively slower than the reset time of diode 210, although the scope of the claimed subject matter is not limited in this respect.

Figure 3:
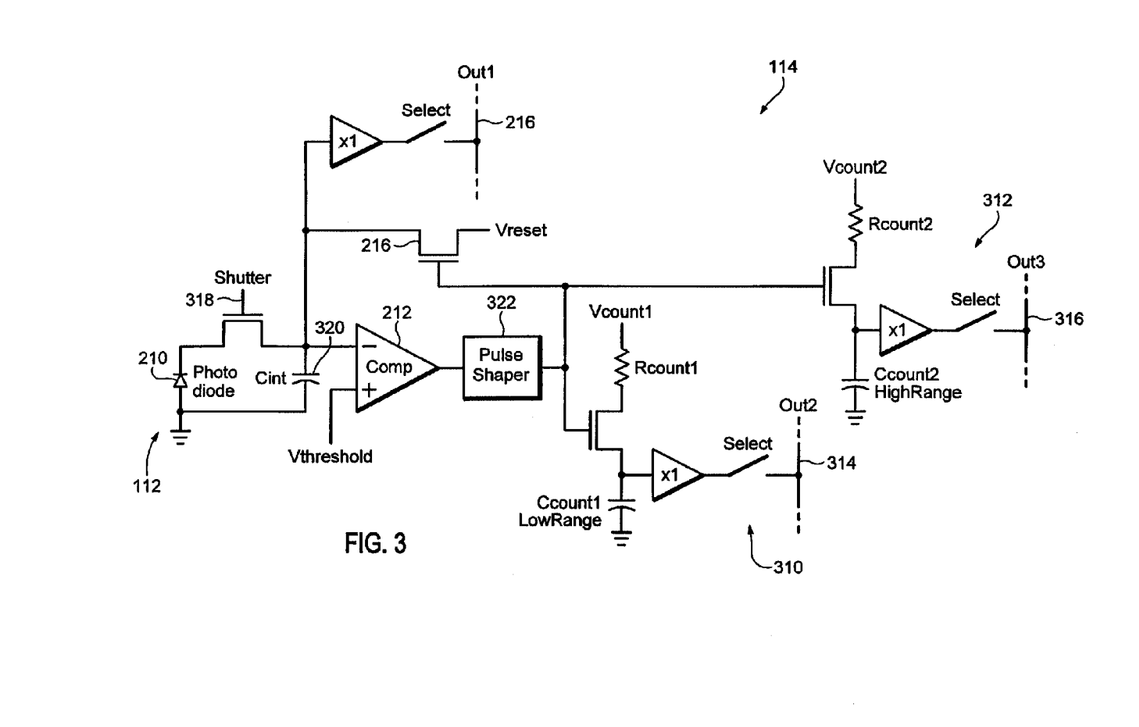
FIG. 3 is a circuit diagram of an alternative image sensor and signal processing circuit in accordance with one or more embodiments.

Referring now to FIG. 3, a circuit diagram of an alternative image sensor and signal processing circuit in accordance with one or more embodiments will be discussed. In the embodiment of image sensor 112 and signal processing circuit 114 shown in FIG. 3 may be substantially similar to image sensor 112 and signal processing circuit 114 of FIG. 2, where two or more counting circuits 310 and 312 may be utilized. Counting circuit 310 may be a relatively faster counting circuit in that counting circuit 310 may accumulate charge relative faster, but which may operate over a relatively lower range. Counting circuit 312 may be relatively slower counting circuit in that counting circuit 312 may accumulate charge relatively slower, but which may operate over a relatively higher range. As shown in the arrangement of signal processing circuit 114 of FIG. 2, counting circuit 310 and counting circuit 312 may be coupled in parallel. Such an arrangement of signal processing circuit 114 using a greater number of counting circuits may provide a higher precision that an arrangement that uses a fewer number of counting circuits. The precision of signal processing circuit 114 may also be increased by utilization of pulse shaping circuit 322 coupled to an output of comparator 212.

Furthermore, in one or more embodiments, switch 318 may be coupled to photodiode 210 to function as an electronic shutter control in combination with capacitor coupled in parallel with photodiode 210, for example to provide continuous operation of image sensor 112 and/or signal processing circuit 114 such as to capture video, although the scope of the claimed subject matter is not limited in this respect. In one or more alternative embodiments, the threshold voltage for comparator 212 may be set at and/or near ground, and/or at the voltage seen at the anode of photodiode 210 when reverse biased, for example where the saturation limit of photodiode 210 is equal to, or at least nearly equal to, ground and/or $V_{DD}$. Such a threshold voltage may be based at least in part on a desired mode of operation of photodiode 210 and/or the design voltages of image sensor 112 and/or signal processing circuit 114, although the scope of the claimed subject matter is not limited in this respect.

Figure 4:
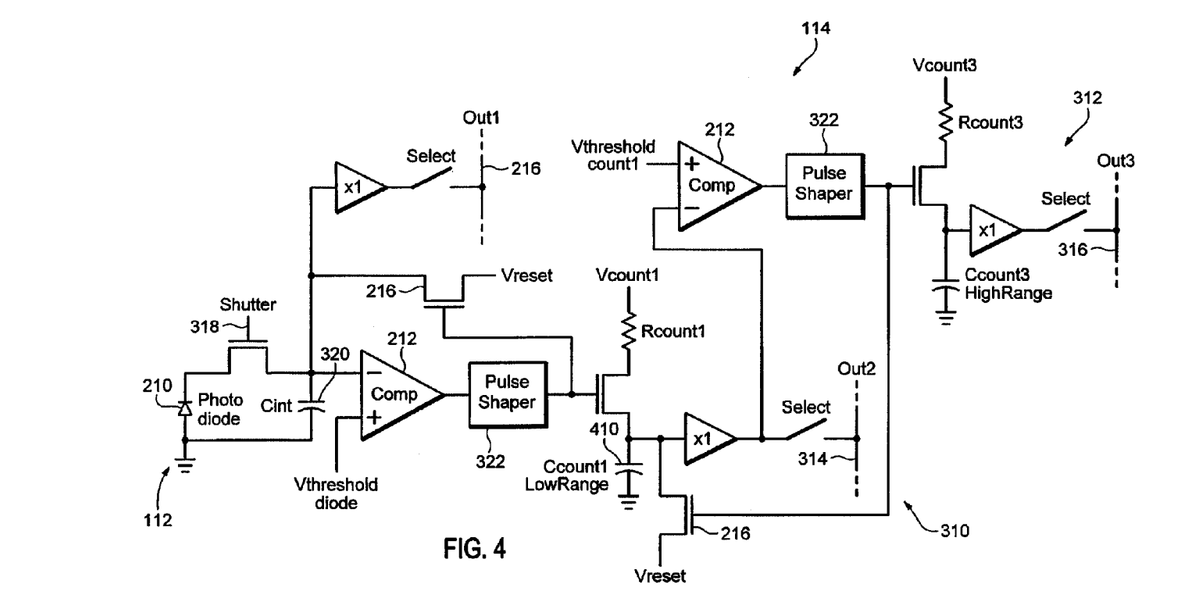
FIG. 4 is a circuit diagram of another alternative image sensor and signal processing circuit in accordance with one or more embodiments.

Referring now to FIG. 4, a circuit diagram of another alternative image sensor and signal processing circuit in accordance with one or more embodiments will be discussed. In the embodiment of image sensor 112 and signal processing circuit 114 shown in FIG. 4 may be substantially similar to image sensor 112 and signal processing circuit 114 of FIG. 2 and/or FIG. 3, where the dynamic range of image sensor 112 and/or signal processing circuit 114 may be further increased by using two more comparators 212, counting circuits 310 and 312, and reset switches 216. As shown in the arrangement of signal processing circuit 114 of FIG. 2, counting circuit 310 and counting circuit 312 may be coupled in parallel, and counting capacitor 410 of counting circuit 310 may be utilized as an input to a downstream comparator 212. In one or more embodiments, variations in the circuits and/or components of image sensor 112 and/or signal processing circuit 114, for example manufacturing process variations, may be accommodated, for example via calibration per pixel, which may be handled in software running on processor 118. Furthermore, non-linear charge build up in photodiode 210 and/or in counting capacitor 410 may be accommodated for example through readout in analog-to-digital converter 116 and/or in post processing software running on processor 118, although the scope of the claimed subject matter is not limited in this respect.

Figure 5:
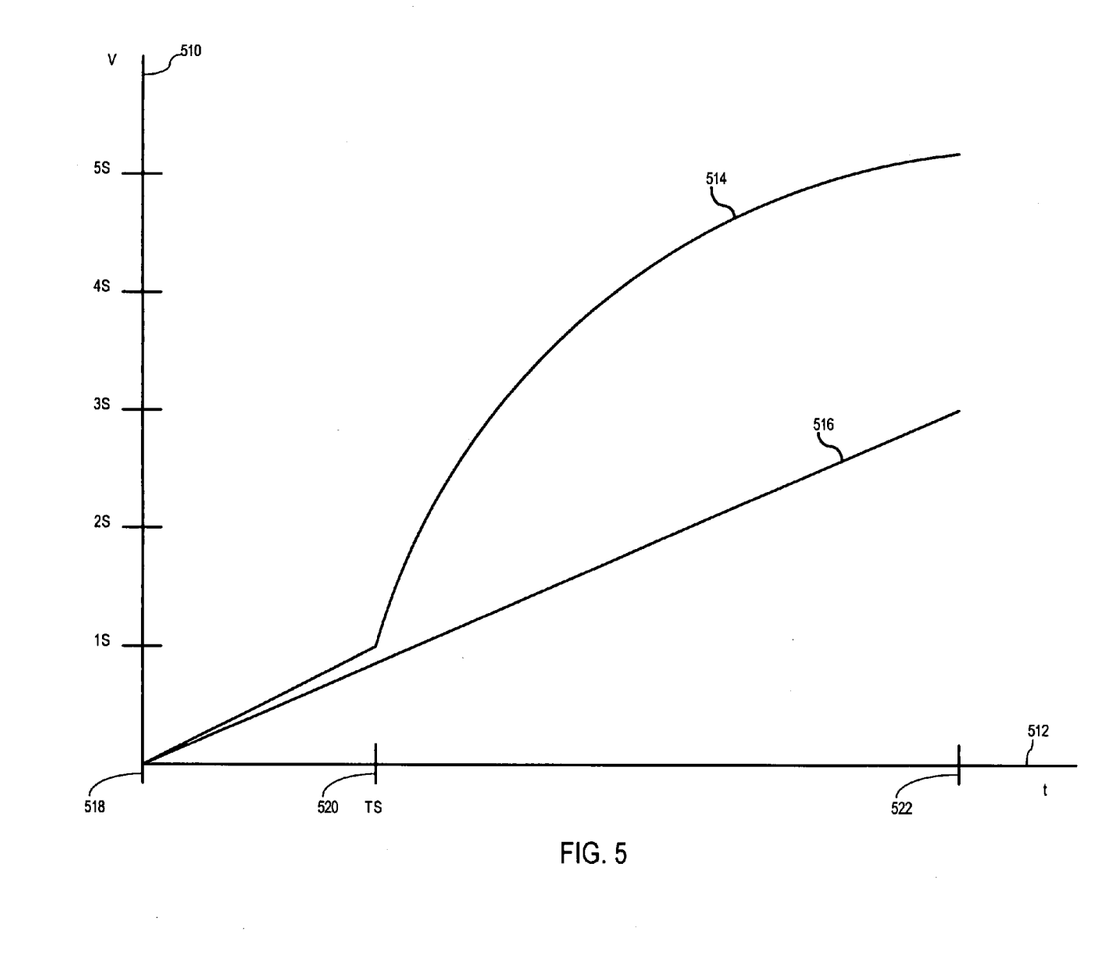
FIG. 5 is a graph of an output of an image sensor and signal processing circuit in accordance with one or more embodiments.

Referring now to FIG. 5, a graph of an output of an image sensor and signal processing circuit in accordance with one or more embodiments will be discussed. In the graph shown in FIG. 5, the vertical axis 510 represents voltage and/or charge, and the horizontal axis 512 represents time. Plot 514 represents the charge accumulated on photodiode 210 as it collects an image from a light signal using image sensor 112 and/or signal processing circuit 114 in accordance with one or more embodiments. Plot 516 represents the charge accumulated on photodiode for one saturation period, extrapolated linearly beyond saturation. As shown by plot 514, signal processing circuit 114 may account for a time varying intensity of the light signal impinging upon photodiode 210 of image sensor 112, and/or for capacitor 410, for multiple period of charging to saturation. At time 518, a shutter and/or switch 318 may be opened, and charge may accumulate based in response to the intensity of the impinging light. When photodiode 210 and/or capacitor 410 reaches saturation at time 520, photodiode 210 and/or capacitor 410 may be reset by switches 216, and image capturing may continue for successive charge cycles while additional charge is accumulated until a next saturation point, for saturation points 1S, 2S, 3S, 4S, 5S, and so on, until image capturing is complete, for example at time 522. As can be seen in FIG. 5, image sensor 112 and/or signal processing circuit 114 may capture a more accurate and/or precise representation of the light signal where the intensity of the light signal may vary over multiple saturation periods, although the scope of the claimed subject matter is not limited in this respect.

Figure 6:
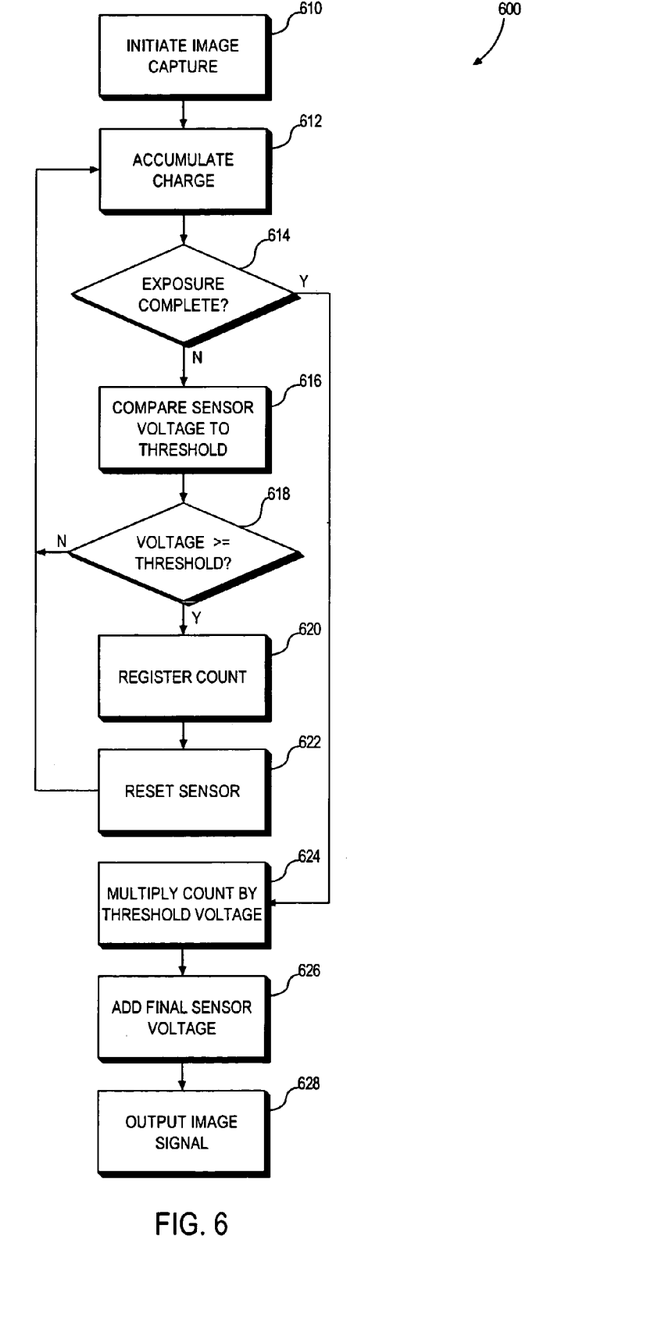
FIG. 6 is a flow diagram of a method for sensing an image in accordance with one or more embodiments.

Referring now to FIG. 6, is a flow diagram of a method for sensing an image in accordance with one or more embodiments will be discussed. Method 600 as shown in FIG. 6 may include more and/or fewer blocks than shown, and furthermore the blocks of method 600 are not limited to the particular order shown, and other orders of the blocks may be implemented in one or more alternative embodiments. Image capture may initiate at block 610, and image sensor 112 may accumulate a charge at block 612 based at least in part in response to an intensity of a light signal corresponding to the image. A determination may be made at block 614 whether exposure of the image is complete. If exposure of the image is not complete, the sensor voltage may be compared to a threshold voltage at block 616. A determination may be made at block 618 whether the sensor voltage has reached and/or exceeds the threshold voltage. If the sensor voltage has not reached and/or exceeds the threshold voltage, then method 600 may continue at block 612 where image sensor 112 may continue to accumulate charge. In the event the sensor voltage has reached and/or exceeds the threshold voltage, then a count may be registered at block 620, and image sensor 112 may be reset at block 622.

In the event a determination is made at block 614 that exposure is complete, for example when a shutter and/or switch 318 closes, the number of counts registered may be multiplied by the threshold voltage, and a final sensor voltage may be added at block 626 to the multiplication product. An image signal representative of the captured image may be output at block 628 where the output image signal may be further processed, converted from an analog to a digital signal via analog-to-digital converter 116 to be processed by processor, and so on, although the scope of the claimed subject matter is not limited in this respect.

Although the claimed subject matter has been described with a certain degree of particularity, it should be recognized that elements thereof may be altered by persons skilled in the art without departing from the spirit and/or scope of the claimed subject matter. It is believed that a higher dynamic range image sensor with signal integration and/or many of its attendant applications will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus, comprising:
   a comparator;
   an image sensor coupled to an input of said comparator, wherein the output of said comparator is triggered in the event a voltage of said image sensor meets and/or exceeds a threshold voltage;
   a counting circuit coupled to an output of said comparator, said counting circuit comprising a capacitor to be charged in proportion to a number of times the comparator is triggered by said image sensor, wherein said counting circuit comprises a lower range counting circuit and a higher range counting circuit;
   wherein an output signal, representative at least in part of a light signal detected by said image sensor, is based at least in part on a voltage of the capacitor and a charge on the image sensor.

2. An apparatus as claimed in claim 1, wherein said image sensor comprises a photodiode.

3. An apparatus as claimed in claim 1, further comprising a switch to reset said image sensor in the event the comparator is triggered.

4. An apparatus as claimed in claim 1, further comprising a pulse shaper coupled to the output of said comparator to shape the output of the comparator for said counting circuit.

5. An apparatus as claimed in claim 1, further comprising a switch coupled in series with said image sensor and a capacitor coupled in parallel with said image sensor to function as a shutter control.

6. An apparatus as claimed in claim 1, wherein one of said lower range counting circuit or said higher range counting circuit comprises a higher precision counting circuit and another of said lower range counting circuit or said higher range counting circuit comprises a lower precision counting circuit.

7. An apparatus as claimed in claim 1, wherein said lower range counting circuit comprises a higher precision circuit, or said higher range counting circuit comprises a lower precision circuit, or combinations thereof.

8. An apparatus as claimed in claim 1, further comprising a second comparator having an input coupled to said lower range counting circuit, and said higher range counting circuit coupled to an output of said second comparator.

9. A method, comprising:
   comparing a voltage of an image sensor to a threshold voltage;
   registering a count when the voltage of the image sensor meets and/or exceeds a threshold voltage, said registering comprising counting over a lower range of counts with a first counting circuit and counting over a higher range of counts with a second counting circuit;
   resetting the image sensor when a count is registered;
   continuing with said comparing, said registering, and said resetting until an exposure is complete; and
   providing an output voltage representing a number of counts, and a voltage of the image sensor.

10. A method as claimed in claim 9, further comprising performing pulse shaping of a signal that causes said registering to occur.

11. A method as claimed in claim 9, further comprising executing said comparing, said registering, said resetting, said continuing and said providing while a shutter switch is closed.

12. A method as claimed in claim 9, said registering comprising counting at a lower precision with the second counting circuit and counting at a higher precision with the first counting circuit.

13. An apparatus, comprising:

means for comparing a first input with a second input;

means for providing a voltage in response to a light signal, said voltage providing means being coupled to the first input of said comparing means, wherein an output of said comparing means is triggered in the event a voltage of said voltage providing means meets and/or exceeds a threshold voltage applied to the second input of said comparing means; and a means for accumulating a charge, said charge accumulating means being coupled to the output of said comparing means, wherein said accumulating means accumulates a charge proportional to a number of times said comparing means is triggered by said voltage providing means, wherein said accumulating means comprises a lower range accumulating means and a higher range accumulating means;

wherein an output signal, representative at least in part of a light signal detected by said voltage providing means, is based at least in part on a charge accumulated by said accumulating means and a voltage of said voltage providing means.

14. An apparatus as claimed in claim 13, wherein said voltage providing means comprises a photodiode.

15. An apparatus as claimed in claim 13, further comprising means for controlling a current path to reset said voltage providing means in the event said comparing means is triggered.

16. An apparatus as claimed in claim 13, further comprising means for shaping a pulse, said pulse shaping means being coupled to the output of said comparing means, said pulse shaping means to shape the output of the comparing means for said accumulating means.

17. An apparatus as claimed in claim 13, further comprising means to selectively activate said voltage providing means.

18. An apparatus as claimed in claim 13, wherein one of said lower range accumulating means or said higher range accumulating means comprises a higher precision accumulating means and another of said lower range accumulating means or said higher range accumulating means comprises a lower precision accumulating means.

19. An apparatus as claimed in claim 13, wherein said lower range accumulating means comprises a lower range, higher precision counting circuit and said higher range accumulating means comprises a higher range, lower precision counting circuit.

20. An apparatus as claimed in claim 13, further comprising a second comparing means having an input coupled to said lower range accumulating means, and said higher range accumulating means coupled to an output of said second comparing means.

21. An apparatus, comprising:

means for comparing a voltage of an image sensor to a threshold voltage;

means for registering a count when the voltage of the image sensor meets and/or exceeds a threshold voltage, said registering means comprising first counting means for counting over a lower range of counts and second means for counting over a higher range of counts;

means for resetting the image sensor when a count is registered; and means for providing an output voltage representing a number of counts, and a voltage of the image sensor.

22. An apparatus as claimed in claim 21, further comprising means for pulse shaping of a signal that activates said registering means.

23. An apparatus as claimed in claim 21, further comprising means for selectively activating said comparing means.

24. An apparatus as claimed in claim 21, said second means comprising means for counting at a lower precision and said first means comprising second counting means for counting at a higher precision.

\* \* \* \* \*